United States Patent

Norbury, Jr. et al.

[11] Patent Number: 5,538,470
[45] Date of Patent: Jul. 23, 1996

[54] LOUVER ROTATING RATCHET ASSEMBLY

[76] Inventors: Raymond L. Norbury, Jr., 1615 Perryton Dr., Dallas, Tex. 75224; Roger H. Simonsen, 2006 Vicksburg Dr., Sachse, Tex. 75048

[21] Appl. No.: 418,386

[22] Filed: Apr. 7, 1995

[51] Int. Cl.$^6$ .................................................. B60H 1/34
[52] U.S. Cl. .................................... 454/152; 454/155
[58] Field of Search .................................. 454/152, 155, 454/202, 313, 316

[56] References Cited

U.S. PATENT DOCUMENTS

| | | | |
|---|---|---|---|
| 3,587,442 | 6/1971 | Jakeway | 454/319 |
| 3,735,691 | 5/1973 | Gofton et al. | 454/155 X |
| 4,345,510 | 8/1982 | Sterett | 454/155 X |
| 4,646,625 | 3/1987 | Schroeder | 454/155 X |
| 4,750,410 | 6/1988 | Parker | 454/155 |
| 5,338,252 | 8/1994 | Bowler et al. | 454/155 |

FOREIGN PATENT DOCUMENTS

| | | | |
|---|---|---|---|
| 91142 | 7/1981 | Japan | 454/155 |
| 79939 | 4/1986 | Japan | 454/155 |
| 147 | 1/1992 | Japan | 454/319 |

*Primary Examiner*—Harold Joyce
*Attorney, Agent, or Firm*—T. D. Copeland; David W. Quimby

[57] ABSTRACT

An air directional louver device, which incorporates one or more multi-grooved ratchet style notches to cooperate with corresponding mating fixed pointer to mesh together. Once the rotating ratchet grooves on the louver's axles and one or more fixed knife-edge pointer are meshed, the louver can be held better in the last desired air direction set position than without the ratchet and pointer. The rotating ratchet will help prevent also vibration and/or the forced air to the louver or to the fixed knife-edge pointer area from moving the louver frame to another undesirable position. The fixed knife edge pointer, in another embodiment, will be rounded at its point for smoother operation and applied into the louver's corresponding holding area. Further change in the friction to change the louver position from one notch to another is attained by rounding the point and deepening the notches if desired.

14 Claims, 2 Drawing Sheets

LOUVER ROTATING RATCHET ASSEMBLY

BACKGROUND OF THE INVENTION

1. Field of Use

This invention will be used in air conditioning units, particularly in automotive units, where it is imperative that the air directing louver will maintain the position at which the user has set it, notwithstanding the jolts and vibration the unit will experience in automotive travel.

2. Prior Art

There are numerous prior art air conditioning units that use an air directing louver of the type disclosed herein, but none are believed to employ the inventive concepts as used in the louver assembly of this invention.

SUMMARY OF THE INVENTION

A principal object of this invention is to provide a means for adjusting the direction of the air flow passing through an air conditioning unit in such a manner that, once adjusted, the setting will be maintained until deliberately changed by the user.

A further object is to provide an adjustable louver for an automotive air conditioning unit that will not be thrown out of adjustment by the jolts and vibrations present in automotive use.

Another object is to provide a louver for directing conditioned air that is extremely easily adjusted for air direction, but maintains its adjustment under normal operating conditions.

Still another object is to provide a unique ratchet and knife-edge pointer for the purpose of holding an air conditioning louver in place until deliberately changed by the user.

An additional object of this invention is to produce a ratchet wheel that floats on a spring member integral with the louver frame.

These and other objects will become apparent from a perusal of the specification, claims and the drawings herein.

DESCRIPTION OF THE PREFERRED EMBODIMENT(S)

Figure 1:
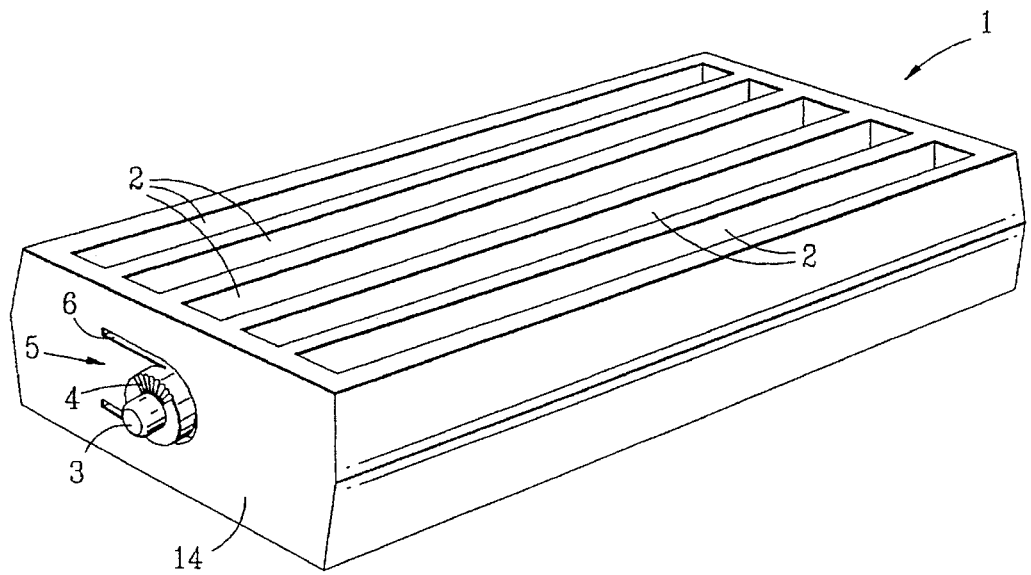
FIG. 1 is a perspective view of the unique louver frame of this invention.
Figure 2:
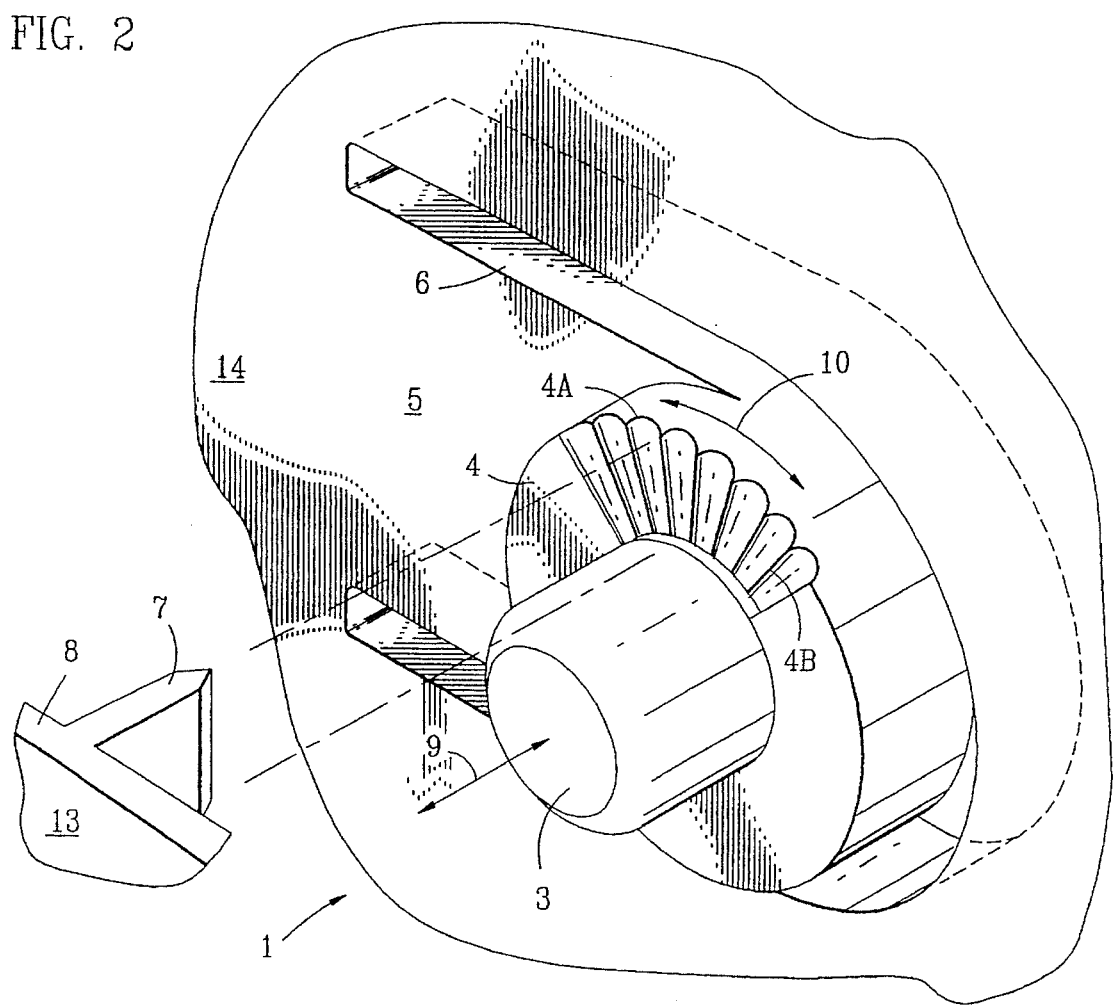
FIG. 2 is an enlarged perspective view of the ratchet wheel and U-shaped spring therefor, showing a detached view of the knife-edged pointer that cooperates therewith.
Figure 3A:
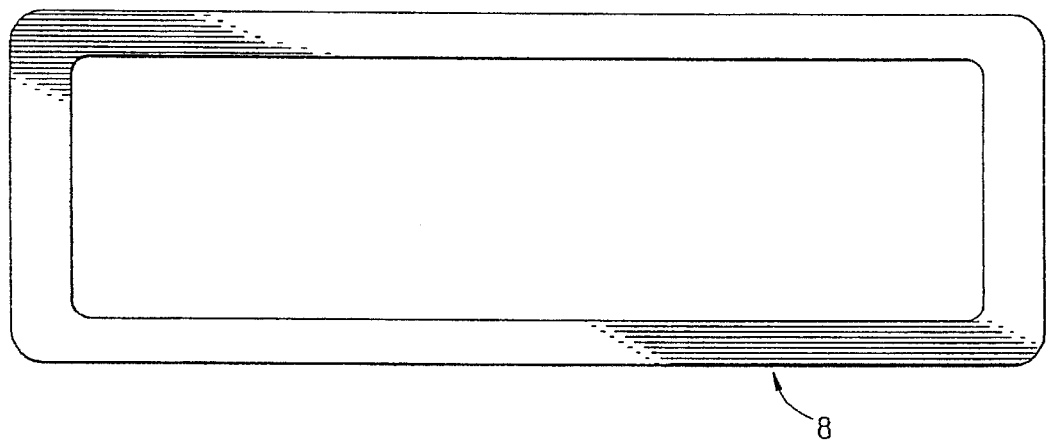
FIGS. 3A & 3B are the top & bottom plan view of the bezel that receives the frame of FIG. 1 to complete the louver assembly.
Figure 3B:
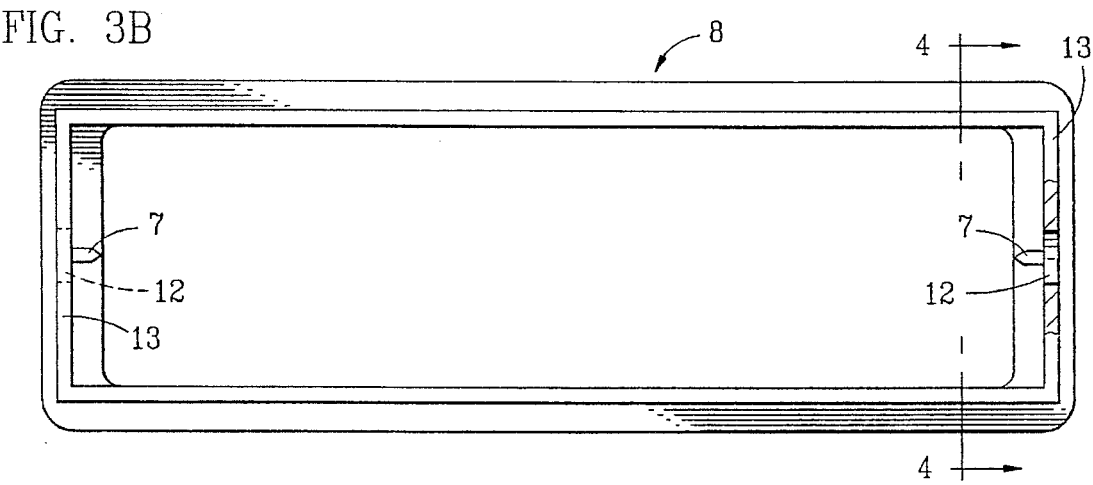
Figure 4:
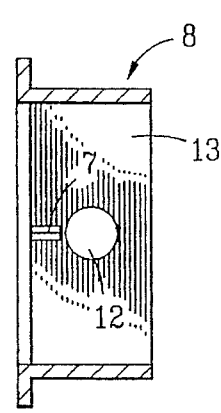
FIG. 4 is a sectional view taken along the lines 4—4 of FIG. 3B.

It will be observed in FIGS. 1–3, that the complete louver assembly of this invention comprises an elongated louver frame 1 to be inserted in bezel, panel or holder 8, to provide an adjustable air directing assembly wherein the air directing frame 1, once will retain its setting until reset by the user under normal operating conditions.

Referring now more particularly to FIG. 1, it will be observed that louver frame 1 includes a plurality of elongated air openings 2, within the plastic encasement of frame 1. At each longitudinal end 14 of frame 1, there is located a horseshoe shaped open slot 6, which defines a central elongated cantilever spring 5, at the free end of which is situated a ratchet wheel 4 having a plurality of ratchet teeth 4B that are positioned to engage a knife-edge pointer 7 located in the inside edge of bezel 8.

When the louver frame 1 is inserted into bezel 8, the axles 3 will be depressed inward as shown by arrow 9, until they line up with axle holes 12 at each longitudinal end of bezel 8. At this point, the axles 3, being depressed by the bezel ends 13 when inserted, will spring back to their normal position through the action of the U-shaped plastic spring 5, and at this position, louver frame 1 may rotate about the axle centerline within the bezel 8. At this point in the installation, the bezel knife-edge pointer 7 is in engagement with one of the grooves 4A of ratchet wheel 4 which will rotate to other grooves 4A, when louver frame 1 is manually rotated by the user to arrive at the desired position of air flow direction.

The plastic material from which the louver frame is constructed is flexible enough when configured into the U-shape of ratchet spring 5, to permit the spring 5 to give in with spring action, in the direction of arrow 9, when the frame 1 and axle 3 are rotated about the axis of the axle and in either direction of arrow 10. This action permits the pointer 7 to move from one groove 4A of adjustment to another as the user determines the desired position of rest.

In summary, the air conditioning louver assembly of this invention is economical to manufacture, and very effectively fulfills the objects of this invention, by providing a unique louver assembly made of a plastic material that permits a portion of the material to possess a spring action so that a knife-edge pointer on the bezel of this assembly may engage a ratchet wheel on the louver frame to permit manual rotation of the louver frame by the user to attain a desired position of rest and a specific air flow direction, and yet remain in that set position until the user manually changes the position, notwithstanding the exposure of the louver frame and bezel to vibration or jolts of the type encountered in automotive use.

The foregoing description and disclosure are representative of the concept of this invention, which may be practiced in many ways without departing from the scope and spirit of this invention; and the devices and methods shown herein may be accomplished in many ways within the scope of the appended claims.

What is claimed is:

1. A louver assembly, having a louver frame, and a bezel, comprising, in combination:
    a. a spring member extending in cantilever fashion in at least one end of said louver frame,
    b. an axle and ratchet at the free end of said spring member,
    c. said axle being aligned with an axle hole in said bezel,
    d. said ratchet including a quantity of ratchet grooves and teeth therein,
    e. a pointer extending from said bezel into engagement with one of said grooves and preventing undesired movement of said louver frame.

2. A louver assembly as in claim 1, wherein said grooves are positioned radially in said ratchet.

3. A louver assembly as in claim 1, wherein said pointer has a knife-edge for engagement with said grooves.

4. A louver assembly as in claim 1, wherein said bezel includes axle holes and louver frame axles in alignment with said axle holes, and wherein said spring member is substantially depressed by said bezel to permit said axles to engage said axle holes.

5. A louver assembly as in claim 1, wherein said bezel includes axle holes and louver frame axles, and wherein said spring member is slightly depressed to permit said ratchet wheel grooves to selectively engage said pointer when said louver frame is rotated by the user to obtain a desired position of air flow direction.

6. A louver assembly comprising a louver frame and a panel in cooperation therewith, a. a U-shaped spring member extending in cantilever fashion from at least one end of said louver frame, b. an axle and a ratchet wheel at the free end of said spring member, c. said axle being concentric within said ratchet wheel, d. said ratchet wheel including a quantity of ratchet grooves and teeth therein, e. a pointer extending from said panel into engagement with one of said grooves and preventing undesired movement of said frame.

7. A louver as in claim 6, wherein said pointer has a rounded edge for smoother movement from one groove to another.

8. A louver assembly, as in claim 6, wherein said pointer and ratchet grooves are made of differing length and depth, respectively, to cause differing degrees of friction in their relative movement and thereby cause differing degrees of resistance to undesired movement of said louver from its user set position.

9. A louver assembly comprising a louver frame and a louver holder in cooperation therewith, a. a spring member extending in cantilever fashion in at least one end of said louver frame, b. an axle and a ratchet at the free end of said spring member, c. said ratchet including a plurality of ratchet grooves and teeth therein, d. a pointer extending from said louver holder into engagement with at least one of said grooves and preventing undesired movement of said louver frame.

10. A louver assembly as in claim 9, comprising separate members of a frame, and a louver holder having relative movement therebetween, a. a spring member extending from at least one of said members, b. a pointer and a cooperating ratchet on different members, c. means to manually move said frame, relative to said louver holder to change the direction of air flow through said assembly when desired, and d. said spring member, said pointer and said ratchet acting to prevent undesired relative movement between said frame and said louver holder.

11. A louver assembly as in claim 10, wherein said ratchet comprises a wheel.

12. A louver assembly as in claim 11, wherein said ratchet wheel is stationary with regard to said louver frame.

13. A louver assembly as in claim 11, wherein said ratchet is an integral part of said spring member.

14. A louver assembly as in claim 9, wherein said axle and said ratchet are integral with said spring member and with each other.

\* \* \* \* \*